May 3, 1955   R. W. LAWTON, JR   2,707,650
BUMPER AND END GATE
Filed Oct. 18, 1952
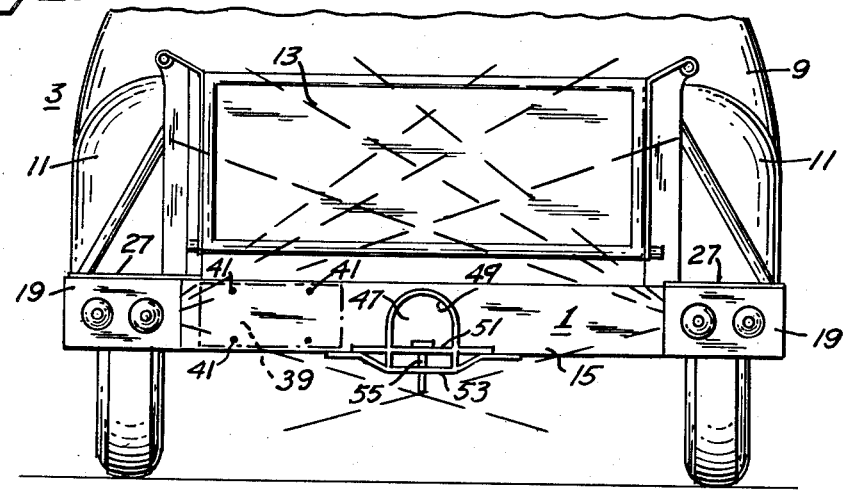
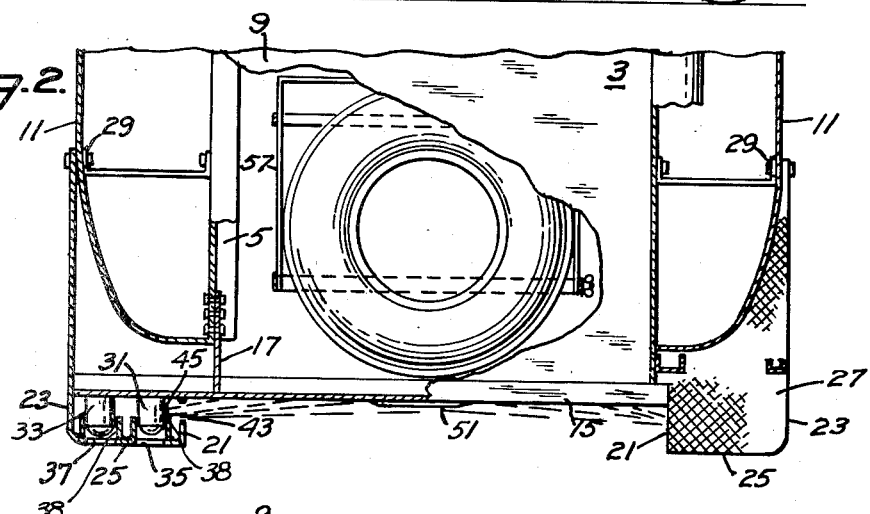
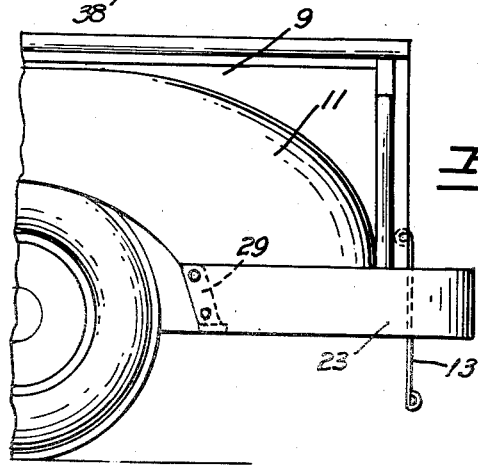
INVENTOR.
ROBERT W. LAWTON JR.
BY
Bruce & Brosler
HIS ATTORNEYS

United States Patent Office 2,707,650
Patented May 3, 1955

2,707,650

BUMPER AND END GATE

Robert W. Lawton, Jr., Grass Valley, Calif.

Application October 18, 1952, Serial No. 315,487

5 Claims. (Cl. 293—69)

My invention relates to bumpers and more particularly to rear bumpers for light delivery trucks and the like.

Among the objects of my invention are:

(1) To provide a novel and improved bumper;

(2) To provide a novel and improved bumper for trucks and the like;

(3) To provide a novel and improved rear bumper for automotive vehicles, which permits dropping of a tail gate to substantially a hanging position;

(4) To provide a novel and improved bumper for trucks or the like which not only permits dropping of a tail gate to substantially a hanging position, but also includes in its construction, end platforms for use by an operator in the loading and unloading of such vehicle;

(5) To provide a novel and improved bumper for trucks or the like, which embodies means for illuminating the rear end of such vehicle;

(6) To provide a novel and improved rear bumper for vehicles, which bumper in addition to the aforementioned attributes, also provides means for the mounting and illumination of a license plate, as well as the inclusion of tail lights.

Additional objects of my invention will be brought out in the following description of a preferred embodiment of the same, taken in conjunction with the accompanying drawing wherein—

Figure 1 is a rear view in elevation of a vehicle with the bumper of the present invention installed;

Figure 2 is a plan view, partly in section, of the rear portion of the vehicle of Figure 1, with the bumper installed;

Figure 3 is a side view in elevation of the showing of Figure 2.

Referring to these drawings for details of my invention in its preferred form, the bumper 1 is shown installed at the rear end of a truck 3, one commonly referred to as the "pick-up" body type. Such vehicle has a frame including spaced-apart channel beams 5 and 7 running longitudinally of the vehicle, a body 9 mounted on such frame and including a wheel fender 11 alongside each channel beam adjacent the rear end of the vehicle, and a drop gate 13 hingedly supported above and in a direction transversely of the frame, at the rear end of the vehicle.

The bumper of the present invention comprises a channel beam 15 of a length comparable to the distance between the outermost points on the rear fenders. At spaced points within such bumper channel beam are affixed a pair of brackets 17 extending outwardly from the channel beam, the spacing between such brackets being approximately that between the frame channel beams 5 and 7 to permit attachment of the bumper channel beam to the rear ends of the channel beams of the frame. For this purpose, the frame channel beams and brackets are provided with matching bolt holes to facilitate such attachment, although it is within the province of the present invention to weld the bumper brackets to the frame beams of the vehicle. In attaching the bumper channel beam, the beam is preferably located approximately in the vertical plane through the hinge axis of the tail gate.

At each end of the bumper beam there is provided a bumper guard 19 which is so constructed as to provide both a platform, and a housing for signal lights at each end of the bumper. Each bumper guard accordingly includes an inner side wall 21 and an outer side wall 23 affixed to the bumper channel beam 15, both extending rearwardly from the channel beam, where they are connected by an end wall 25, all of heavy gauge sheet steel.

The outer side wall extends also forwardly of the bumper channel beam to terminate alongside one of the fenders, and a platform plate 27 is affixed to the upper edges of these side walls and end wall as well as the adjacent bracket, such platform plate having its forward edge contoured to the surface of the adjacent fender. At the location of approach of the outer wall to the adjacent fender, the outer wall is bolted to the fender, and to rigidify such connection, a reinforcing bar 29 is disposed against the inner surface of the fender along the line of attachment.

To the bumper channel beam, within the space defined by such member and the bumper guard, the customary tail light 31 and back-up light 33, if such be desired, are mounted. Suitable windows 35, 37, provided in the end wall of the guard in proper alignment with such lights within, permit such signal means to be visible to the rear of the vehicle.

These lights may be serviced through the window openings by removal of the lenses which might be retained by spring rings in the conventional manner.

As a protection against stones, mud, etc., short lengths of tubing 38 are welded in the window openings of the tail lights and back-up lights, and these serve the added advantage of reinforcing the bumper guard portions of the bumper.

The channel member of the bumper provides a convenient location for the application of the rear license plate 39. Bolt holes 41 for the application of such license plate adjacent one of the bumper guards are provided in the bumper channel beam and illumination of the license plate when so located is accomplished by providing a window 43 in the proximate inner wall of the bumper guard in line with a suitable source of illumination disposed within such guard. Such source of illumination may take the form of a colorless side lens 45 in the tail light 31.

The window 43 is preferably of such size as to permit the angle of illumination to cover the remote portion of the rear end of the truck, and by providing a similar source of illumination in the opposite bumper guard, complete illumination of the truck rear end may be had.

Also embodied in the bumper construction is a trailer hitch. This is formed in the lower edge of the bumper channel beam, centrally thereof, by first removing a portion therefrom to create a semi-circular edge notch 47 in the vertical plane of the beam, strengthening such notched portion along its edge by a reinforcing strip 49 welded thereto, and spanning the notch by horizontally disposed strips 51 and 53 in vertically spaced relationship to receive therebetween, the draw bar of a trailer. These strips are provided with aligned openings for the reception of a holding pin 55, to hold the trailer draw bar to the hitch.

Space for a spare tire exists between the frame channel beams, adjacent the bumper, and when so utilized, a spare tire rack 57 may be supported between the frame beams for this purpose.

It will be appreciated that the aforementioned structure embodied in the bumper of the present invention, not only offers the integrally formed and highly useful end platforms, and self contained lighting features, but also results in a very strong and rugged device capable of taking the shocks and impacts to which bumpers are customarily exposed, and without interfering with the ability of the tail gate to drop to a substantially hanging position, which is very desirable in the loading and unloading of such type of vehicle. In this connection, it is further to be noted that the trailer hitch which is built into the bumper, does not interfere with the ability of the tail gate to be so dropped.

Accordingly, while I have disclosed my invention in its preferred form, the same is subject to alteration and modification without departing from the underlying principles involved, and I accordingly do not desire to be limited in my protection to such details as I have illustrated and described except as may be necessitated by the appended claims.

I claim:

1. A bumper for application to a vehicle having a frame including spaced apart channel beams running longitudinally of said vehicle, and a body mounted on said frame and including a wheel fender alongside each channel beam adjacent the rear end of said vehicle and a drop gate hingedly supported above and in a direction transversely of said frame at the rear end of said vehicle; said bumper comprising a channel beam of a length comparable to the distance between the outermost points on said fenders, a pair of mounting brackets affixed to said bumper channel beam within the same and extending outwardly therefrom for attachment to said frame channel beams with said bumper channel beam lying approximately in the vertical plane through the hinge axis of said drop gate; a bumper guard at each end of said bumper channel beam, said bumper guards being spaced from each other a distance in excess of the length of said drop gate, each such bumper guard including an inner side wall and an outer side wall affixed to said bumper channel beam, both extending rearwardly from said bumper channel beam and connected by an end wall; signal light supporting means mounted on said bumper channel beam within the space defined by said side walls and end wall with said channel beam, each of said end walls having at least one window therein for rendering such light signal means visible to the rear; and one of said inner side walls having a window therein for illumination of the adjacent portion of said bumper channel beam; and means providing a trailer hitch on said bumper, said means involving a substantially semi-circular notch formed in the lower edge of said bumper channel beam, centrally thereof, and a pair of horizontally disposed strips spanning said notch in vertically spaced relationship to receive therebetween the drawbar of a trailer, said strips having aligned openings for insertion of a locking pin.

2. A bumper for application to a vehicle having a frame including spaced apart channel beams running longitudinally of said vehicle, and a body mounted on said frame and including a wheel fender alongside each channel beam adjacent the rear end of said vehicle and a drop gate hingedly supported above and in a direction transversely of said frame at the rear end of said vehicle; said bumper comprising a channel beam of a length comparable to the distance between the outermost points on said fenders, a pair of mounting brackets affixed to said bumper channel beam within the same and extending outwardly therefrom for attachment to said frame channel beams with said bumper channel beam lying approximately in the vertical plane through the hinge axis of said drop gate; a bumper guard at each end of said bumper channel beam, said bumper guards being spaced from each other a distance in excess of the length of said drop gate, each such bumper guard including an inner side wall and an outer side wall affixed to said bumper channel beam, both extending rearwardly from said bumper channel beam and connected by an end wall, and said outer side wall extending forwardly of said bumper channel beam to terminate alongside one of said fenders; a platform plate affixed to the upper edges of said side walls, end wall and adjacent bracket, said platform plate having its forward edge contoured to the surface of said fender; means for anchoring said forwardly extending side wall of each bumper guard to its associated fender; signal light supporting means mounted on said bumper channel beam within the space defined by said side walls and end wall with said channel beam, each of said end walls having at least one window therein for rendering such light signal means visible to the rear; and one of said inner side walls having a window therein for illumination of the adjacent portion of said bumper channel beam; and means providing a trailer hitch on said bumper, said means involving a substantially semi-circular notch formed in the lower edge of said bumper channel beam, centrally thereof, and a pair of horizontally disposed strips spanning said notch in vertically spaced relationship to receive therebetween the drawbar of a trailer, said strips having aligned openings for insertion of a locking pin.

3. A bumper for application to a vehicle having a frame including spaced apart channel beams running longitudinally of said vehicle, and a body mounted on said frame and including a wheel fender alongside each channel beam adjacent the rear end of said vehicle and a drop gate of greater length than the spacing of said frame beams, hingedly supported above and in a direction transversely of said frame at the rear end of said vehicle; said bumper comprising a beam of a length substantially the distance between the outermost points on said fenders, means connectible to said frame channel beams for attachment thereto of said bumper with said bumper beam lying below the hinge axis of such drop gate, and a bumper guard extending rearwardly from said bumper beam at each end thereof, said bumper guards being spaced from each other a distance in excess of the length of such drop gate to permit said bumper to receive such drop gate in a downwardly hanging position, and a trailer hitch built into said bumper beam, said trailer hitch involving a substantially semi-circular notch in the lower edge of said bumper beam, and a pair of horizontally disposed strips spanning said notch in vertically spaced relationship to receive therebetween the drawbar of a trailer, said strips having aligned openings for insertion of a locking pin.

4. A bumper for application to a vehicle having a frame including spaced apart channel beams running longitudinally of said vehicle, and a body mounted on said frame and including a wheel fender alongside each channel beam adjacent the rear end of said vehicle and a drop gate of greater length than the spacing of said frame beams, hingedly supported above and in a direction transversely of said frame at the rear end of said vehicle; said bumper comprising a beam of a length substantially the distance between the outermost points on said fenders and having means at an intermediate area thereon for the affixation of a license plate thereto, means connectible to said frame channel beams for attachment thereto of said bumper with said bumper beam lying below the hinge axis of such drop gate, and a bumper guard extending rearwardly from said bumper beam at each end thereof, said bumper guards being spaced from each other a distance in excess of the length of such drop gate to permit said bumper to receive such drop gate in a downwardly hanging position, and at least one of said bumper guards comprising a housing including spaced inner and outer side walls extending rearwardly of said bumper beam and connected by an end wall, said inner wall having a window therein in substantially horizontal alignment with said license plate area, and a light within said housing behind said window in light communication with said license plate area.

5. A bumper for application to a vehicle having a body including a drop gate hingedly secured transversely thereof at the rear end of such vehicle and rear wheel fenders extending along such body but not beyond such drop gate; said bumper comprising a bumper beam, a bumper guard at each end thereof, at least one of which bumper guards is in the form of a housing having a side wall substantially normal to said bumper beam and a light opening therein, said bumper guards being spaced apart a distance in excess of the length of such drop gate to create a recess in said bumper whereby when installed on such vehicle, with said bumper beam in substantially the plane of such drop gate, said bumper is adapted to receive the drop gate in a downwardly hanging position; said bumper beam having means intermediate said bumper guards for the affixation of a license plate thereto; and a source of illumination within said bumper guard housing in position to illuminate such license plate through said light opening with rays emanating in a horizontal plane.

References Cited in the file of this patent

UNITED STATES PATENTS

| Number | Name | Date |
|---|---|---|
| D. 157,586 | Grunbache | Mar. 7, 1950 |
| 1,446,833 | Carlson | Feb. 27, 1923 |
| 1,600,044 | Humphries | Sept. 14, 1926 |
| 1,651,079 | Wernig | Nov. 29, 1927 |
| 1,823,007 | Spencer | Sept. 15, 1931 |
| 2,492,914 | Barden | Dec. 27, 1949 |